United States Patent [19]

Marracino et al.

[11] 4,263,710
[45] Apr. 28, 1981

[54] METHOD OF MANUFACTURING AN ELECTRIC MOTOR

[75] Inventors: Charles R. Marracino, Torrington; William E. Yorker, Winsted, both of Conn.

[73] Assignee: Torin Corporation, Torrington, Conn.

[21] Appl. No.: 39,661

[22] Filed: May 16, 1979

[51] Int. Cl.³ .......................................... H02K 15/14
[52] U.S. Cl. ...................................... 29/596; 29/509; 29/736
[58] Field of Search ................. 29/596, 598, 509, 736; 310/42, 89

[56] References Cited

U.S. PATENT DOCUMENTS

| | | | |
|---|---|---|---|
| 3,555,651 | 1/1971 | Latussek et al. | 29/596 X |
| 4,128,935 | 12/1978 | Czech et al. | 29/596 |

*Primary Examiner*—Carl E. Hall
*Attorney, Agent, or Firm*—McCormick, Paulding & Huber

[57] ABSTRACT

A small inexpensive electric motor construction includes a housing with an axially extending wall having twelve (12) equally circumaxially spaced tabs projecting axially at its free edge. A cylindrical stator assembly is disposed within the axially extending wall and has its peripheral surface lying adjacent and radially within the tabs. A rotor shaft is supported by the housing and projects axially within the axially extending wall. The stator assembly is concentric with the shaft and may vary within a range from a concentric condition to a predetermined maximum condition of eccentricity relative to the axially extending wall. The tabs are deformed so as to expand radially into binding engagement with the peripheral surface of the stator assembly and secure the stator assembly within the housing wall irrespective of the concentricity and/or eccentricity within the predetermined maximum condition of eccentricity. The method and the apparatus for constructing the motor involve the use of a locating means which assures concentricity of stator assembly and shaft and the tabs are deformed with a means limiting radial outward expansion whereby to insure that the radial inward deformation is sufficient to insure binding engagement of the tabs with the peripheral surface of the stator assembly throughout the range of possible conditions of concentricity-eccentricity. Rivets secure the stator assembly axially against axial seating surfaces within the axially extending wall. Alternatively, the tab deformation and binding engagement with the peripheral surface of the stator assembly may be relied upon for radial location and both radial and axial retention of the stator assembly within the housing wall.

5 Claims, 8 Drawing Figures

U.S. Patent  Apr. 28, 1981  Sheet 1 of 2  4,263,710
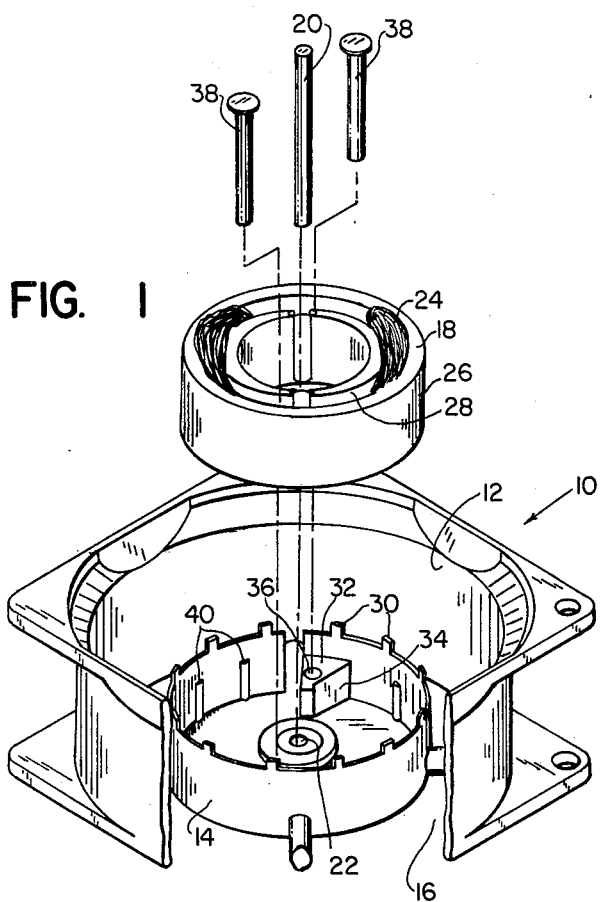
FIG. 1
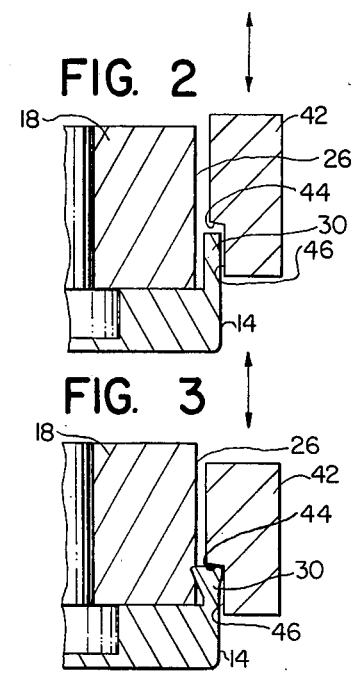
FIG. 2
FIG. 3
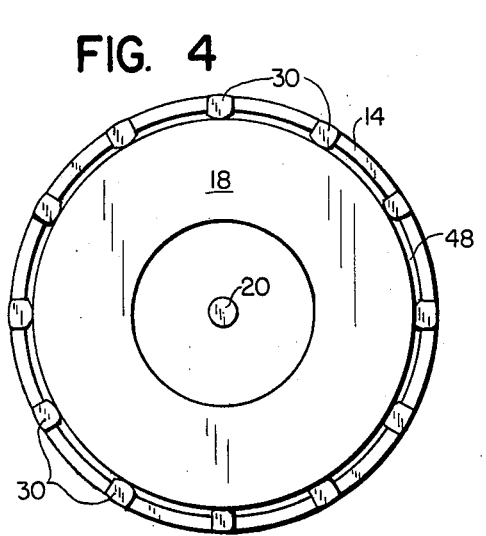
FIG. 4
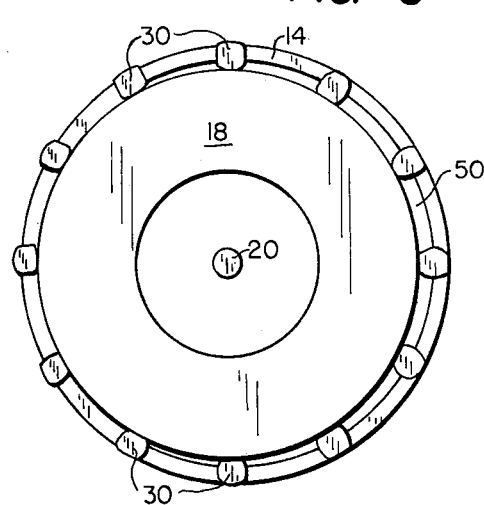
FIG. 5

METHOD OF MANUFACTURING AN ELECTRIC MOTOR

BACKGROUND OF THE INVENTION

Various fastening means including both separate and integral fastening techniques have been employed in the past in the assembly of small inexpensive electric motors wherein housing and stator assemblies are secured in relative position. In particular, in the manufacture of housings having cylindrical walls within which stator assemblies are to be secured, conditions of tolerance must be accommodated and it may be desirable to provide fastening or attachment means adaptable for both a location and a fastening function. That is, a stator assembly may be located relative to its surrounding housing wall or to another motor part and in the latter instance, a degree of eccentricity may occur due to tolerances in manufacturing procedures.

It is the general object of the present invention to provide a fastening means which is adapted to accommodate manufacturing tolerances and which can efficiently locate and fasten a stator assembly within a housing wall, the relationship of the stator assembly to the housing wall varying from a condition of concentricity to a predetermined maximum condition of eccentricity and the fastening means being equally effective throughout the range of such conditions.

SUMMARY OF THE INVENTION

In fulfillment of the foregoing object, an axially extending housing wall is provided with a plurality of axially projecting tabs at a free edge portion. The stator assembly to be secured within the housing wall has an external diameter smaller than the internal diameter of the housing wall and within a predetermined tolerance or range such that a predetermined maximum condition of eccentricity can be determined between the stator peripheral surface and the wall. Thus, the tabs along the free edge of the housing wall can be so dimensioned otherwise designed as to be deformed generally radially inwardly into binding engagement with the peripheral stator surface irrespective of the condition of concentricity or eccentricity of the stator assembly and housing wall. The tabs deform in at least one additional generally radial direction and, preferably, both circumaxially and radially outwardly with the maximum radial inward deformation being at least equal to the aforesaid maximum predetermined condition of eccentricity between the external stator diameter and the internal diameter of the axially extending wall. The additional deformation or radial expansion of the tabs serves to limit the maximum inward radial force exerted by the tabs on the peripheral surface of the stator thus, sufficient radial inward force is exerted on the peripheral surface of the stator to provide for the necessary binding engagement of the tabs and the stator and yet excessive force is avoided as might result in detrimental effects on the stator assembly. Further, it is preferred that the radial outward expansion of each tab be limited to insure that sufficient inward expansion occurs to apply the necessary radial force for good retention and fastening of the stator assembly within the housing wall.

The invention also contemplates both a method and apparatus for assembling and securing together the motor parts and, in the presently preferred embodiment, the stator assembly is located relative to a motor part other than the housing wall and, more specifically, relative to a rotor shaft. The stator assembly is maintained in a condition of concentricity relative to the motor shaft by the assembly apparatus including a locating means which both assembles the shaft with the housing and locates the stator assembly relative thereto. The method is thereafter practiced in manipulation of the assembly apparatus to deform the tabs and to effect secure assembly of stator assembly within the housing wall irrespective of the relationship between the stator assembly and the wall. That is, the relationship between said elements may vary within the aforesaid range of concentricity or 0 eccentricity to maximum eccentricity and effective assembly, location and retention of parts will nevertheless result.

BRIEF DESCRIPTION OF THE DRAWINGS

FIG. 1 is an exploded perspective view showing the electric motor construction of the present invention and includes a housing, a stator assembly, a rotor shaft, and optional rivets for axially securing the stator assembly and housing.

FIG. 2 is a fragmentary enlarged view showing a fastening tab about to be engaged by a deforming tool, the latter forming a part of assembly apparatus or tooling for locating and securing a stator assembly within a housing wall.

FIG. 3 is a fragmentary view similar to FIG. 2 but showing the tool in engagement with a deformed fastening tab.

FIG. 4 is a somewhat enlarged fragmentary view showing a cylindrical housing wall with a stator assembly disposed therewithin and secured in position by deformed integral tabs on the free edge of the housing wall, the stator and housing wall being illustrated in a condition of concentricity.

FIG. 5 is a view similar to FIG. 4 but showing a stator assembly and a housing wall secured together in a condition of maximum eccentricity.

DESCRIPTION OF PREFERRED EMBODIMENT

Figure 8:
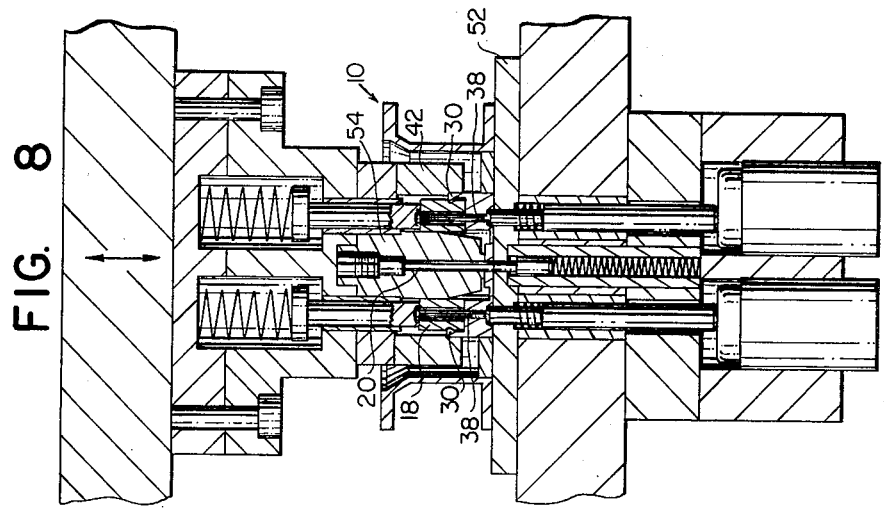
FIG. 8 is a view similar to FIG. 7 but showing the assembly apparatus in a fully closed condition.

Referring particularly to FIG. 1, an electric motor construction in accordance with the present invention, comprises a housing indicated generally by the reference numeral 10. The housing 10 may vary widely in form but is shown as taking a generally rectangular configuration in plan form with an outer cylindrical wall 12 and a spaced inner cylindrical wall 14 defining an annular space 16. The annular space 16 receives an air impeller mounted on and driven by a rotor (not shown) but which is disposed within a stator assembly 18. The stator assembly 18 is received within and must be secured in position in the axially extending inner cylindrical wall 14 and a rotor shaft 20 is also provided and arranged within the stator assembly 18. As shown, the shaft 20 is held by an end wall of the housing 10 and more particularly, is received in a rotor shaft aperture 22 in a press fit. Thus, the shaft 20 is in a cantilever arrangement within the cylindrical space defined by the stator assembly 18 and within the rotor assembly when the motor and fan assembly is complete. The motor construction of the present invention is adaptable for use in a wide variety of small inexpensive electric motors and is in no way limited to motor-impeller or motor-fan combinations or the like.

The stator assembly 18 may be conventional and includes windings 24 and a peripheral surface 26 defined by edge surfaces of its multiple laminations. The stator assembly preferably also includes an epoxy which may extend partially over end surfaces thereof and within and about axial opening surfaces as at 28.

In accordance with the present invention, the peripheral surface 26 of the stator assembly is gripped or engaged in secure and binding relationship by a plurality of small tabs 30, 30. The tabs 30, 30 are formed integrally on and project axially from a free edge of the inner cylindrical housing wall 14. That is, the wall 14 extends axially so as to receive the stator assembly 18 therewithin and the tabs 30, 30 reside adjacent and radially outwardly from the peripheral wall 26 as best illustrated in FIGS. 2 and 3.

Preferably, an axial seating surface is defined within the axially extending wall 14 and, as shown, a seating surface 32 is defined by a radially inwardly projecting lug 34 and a similar and diametrically opposite lug and surface 32, 34 are provided behind the portion of the wall 18 nearest the viewer. Each of the lugs 34 is provided with a rivet receiving aperture 36, one shown, and a pair of cooperating rivets 38, 38 may be entered in the said apertures and through the openings in the stator assembly 18. As will be explained more fully hereinbelow, rivets 38, 38 are shown in FIG. 1 with heads at their upper ends and adapted to be flared or headed at their lower ends beneath the lugs 34, 34 whereby to secure the stator assembly axially in position. Such a construction is optional and the stator assembly may be secured both axially and radially by the tabs 30, 30. Preferably, a plurality of additional small seating surfaces 40, 40 are provided within the wall 14 to prevent the stator assembly 18 from tilting or tipping about an axis extending between the lugs 34, 34.

Referring particularly to FIGS. 2 and 3, it will be observed that the peripheral surface 26 of the stator assembly 18 is disposed in adjacent relationship to a tab 30 adapted to be engaged by a tool 42 movable toward and away from the tab and having an annular substantially radial surface 44 and an annular substantially axially extending surface 46. The axial extending surface 46 is spaced slightly radially outwardly from the tab 30 in FIG. 2 prior to deformation of the tab by the tool. As will be explained hereandbelow, an annular space between the tab 30 and the peripheral surface 26 may vary in accordance with tolerances and conditions of concentricity or eccentricity.

When the tool 42 has moved downwardly in FIG. 3 to deform the tab 30 the tab is caused to expand radially inwardly and outwardly as shown. The radial inward expansion of the tab results in the binding engagement of the tab with the peripheral surface 26 of the stator assembly. The outward expansion of the tab, on the other hand, is limited by the axial surface 46. Further, as illustrated in FIGS. 4 and 5 tab expansion may also occur in circumaxial directions and the exertion of excessive force on the surface 26 is thus avoided. It has been found that the epoxy mentioned above may be subject to crack and/or other detrimental results may occur with such excessive force.

FIGS. 4 and 5 illustrate the manner in which the tabs 30, 30 function to provide for efficient location and retention of a stator assembly within predetermined limits of eccentricity. Manufacturing tolerances result in the space 48 in FIG. 4. The space 48 is annular and of equal dimension throughout, this resulting from a condition of concentricity between stator assembly 18 and the axially extending housing wall 14. With this condition, each of the tabs 30, 30 illustrated in FIG. 4 expands radially inwardly an equal distance whereby to engage and securely hold the stator 18 in position within the housing wall 14. Twelve (12) tabs 30, 30 are illustrated and excellent results have been achieved with such an arrangement. It is believed that the number of tabs should fall within the range eight (8) to sixteen (16) within the scope of the invention and that secure retention of the stator and wall will be achieved without cracking of epoxy or other detrimental results. Further, efficient heat transfer from the stator assembly to the housing is provided for with the twelve (12) tabs shown and the housing thus provides a heat sink operation or function.

In FIG. 5 a condition of maximum eccentricity is illustrated. That is, the stator 18 is in engagement with the housing wall 14 at the left-hand side of the figure and a maximum space 50 occurs at the right-hand side thereof. Thus tabs 30, 30 around the right-hand side of the assembly expand radially inwardly a substantially greater distance than tabs 30, 30 at a left-hand side thereof. Only nominal inward expansion of the tabs 30, 30 at the left-hand side occurs but the stator 18 is nevertheless gripped or clamped between left and right-hand tabs and the tabs throughout the peripheral surface of the stator reside in binding engagement therewith. Radial expansion of tabs outwardly or in a circumaxial direction occurs as required within the confines of the axial wall 46 whereby to locate and secure the stator within the housing wall 14.

From the foregoing it will be apparent that the tab deformation construction of the present invention provides for secure retention of a stator assembly within a housing wall within a substantial range of conditions. That is, a stator and wall connection can be effected when the stator and wall are precisely concentric or at 0 eccentricity, FIG. 4. Similarly, at a condition of maximum eccentricity, FIG. 5, a secure retention of the stator assembly within the wall 14 is achieved. Still further, at any condition of eccentricity between the 0 and maximum condition of FIG. 5, a similar firm retention of the stator assembly is achieved within the housing wall 14.

In the present embodiment of the invention the stator assembly 18 is located relative to the shaft 20 mentioned above. Alternatively, the stator assembly may be located relative to another motor part or relative to its surrounding housing wall such as the wall 14. In the present instance, varying degrees of eccentricity in the stator wall relationship may exist as a result of the requirement that the stator and shaft be maintained in a relationship of concentricity.

Figure 7:
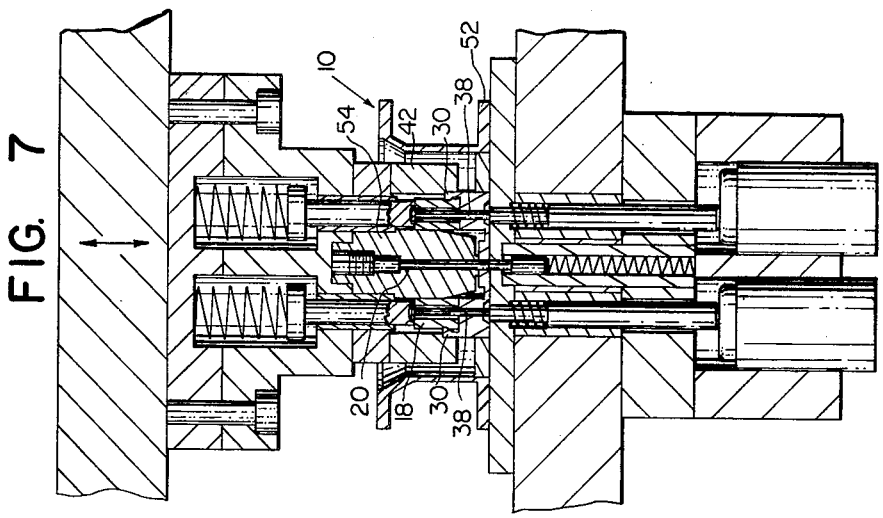
FIG. 7 is a view similar to FIG. 6 but showing the assembly apparatus in a partially closed condition.
Figure 6:
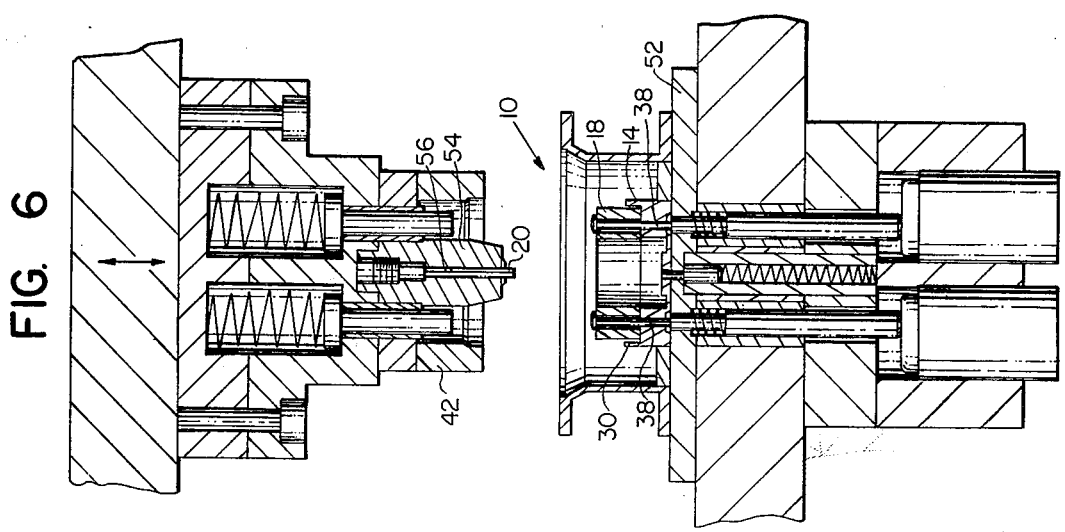
FIG. 6 is a somewhat schematic sectional view showing assembly apparatus for the electric motor construction of the present invention, the apparatus or tooling being shown in an open condition.

The manner in which stator and rotor shaft concentricity is maintained in the present invention is best illustrated in FIGS. 6 through 8 wherein assembly apparatus or tooling is illustrated. Housing 10 is located by pin 51 and secured on support means 52 and has stator 18 placed within its inner housing wall 14 and rivets 38, 38 are placed loosely in position with lower end portions exposed. A movable part of the assembly apparatus includes a locating means or plunger 54 adapted to enter and locate the stator assembly 18 on downward movement. Aperture 56 retains rotor shaft 20 which is urged downwardly into press fit engagement with the housing as the assembly apparatus is closed in FIG. 7. Thus, concentricity of rotor shaft and stator assembly is assured and the forming tool 42 thereafter engages and deforms tabs 30, 30 as illustrated in FIGS. 7 and 8.

Finally, as best illustrated in FIG. 8, small plungers 58, 58 head or flare the rivets 20, 20 at lower end portions whereby to secure the stator assembly and the housing axially. As mentioned above, however, the inclusion of the rivets is optional and both axial and radial retention of the stator assembly within the housing wall 14 may be accomplished by the tabs 30, 30.

We claim:

1. A method for constructing an electric motor comprising the steps of providing a hollow cylindrical housing having an axially extending wall with at least one free edge and a plurality of integrally formed axially projecting tabs spaced circumaxially around said free edge, providing a cylindrical stator assembly and assembling the same within said axially extending wall with a peripheral surface thereof lying adjacent and radially within said tabs, the external stator diameter and the internal diameter of said axially extending wall being so related as to provide a predetermined maximum condition of eccentricity between the stator peripheral surface and the wall, and deforming said tabs generally radially inwardly into binding engagement with said peripheral stator surface and in at least one additional generally radial direction, the maximum radial inward deformation being at least equal to the aforesaid maximum predetermined condition of eccentricity between said external stator diameter and said internal diameter of said axially extending wall, and said additional deformation in another radial direction serving to limit the maximum inward radial force exerted by the tabs on said peripheral surface of the stator.

2. A method for constructing an electric motor as set forth in claim 1 wherein said deformation step includes the exertion of an axially directed force at free ends of the tabs causing the tabs to expand radially into binding engagement with the peripheral surface of the stator and to secure the stator and housing in assembled position.

3. A method for constructing an electric motor as set forth in claim 2 wherein the axially directed deforming force is applied to the free ends of the tabs and tab radial outward expansion is simultaneously limited within a predetermined range, the radial inward expansion of the tabs and the binding engagement of the same with the stator peripheral surface thus being assured irrespective of the concentricity or eccentricity of the wall-stator relationship throughout the permitted range of eccentricity as aforesaid.

4. A method for constructing an electric motor as set forth in claim 3 wherein said stator is located and secured in position within the axially extending housing wall but independently of the wall and instead relative to a motor part other than the housing wall.

5. A method for constructing an electric motor as set forth in claim 4 wherein a rotor shaft is provided and is assembled with the housing so as to project within the axially extending housing wall, and wherein said stator is located and secured in concentric relationship relative to the rotor shaft while said tabs are deformed to secure the stator in assembly with the housing and shaft.

* * * * *